United States Patent
Lim

(10) Patent No.: US 11,966,342 B2
(45) Date of Patent: Apr. 23, 2024

(54) DATA PROCESSING SYSTEM AND OPERATING METHOD THEREOF

(71) Applicant: SK hynix Inc., Icheon (KR)

(72) Inventor: Min Soo Lim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/878,389

(22) Filed: Aug. 1, 2022

(65) Prior Publication Data

US 2022/0382687 A1     Dec. 1, 2022

Related U.S. Application Data

(63) Continuation of application No. 16/996,638, filed on Aug. 18, 2020, now Pat. No. 11,403,236.

(30) Foreign Application Priority Data

Mar. 9, 2020 (KR) ........................ 10-2020-0029131

(51) Int. Cl.
| | | |
|---|---|---|
| *G06F 12/14* | (2006.01) | |
| *G06F 9/30* | (2018.01) | |
| *G06F 9/54* | (2006.01) | |
| *G06F 12/02* | (2006.01) | |
| *G06F 12/084* | (2016.01) | |
| *G06F 13/16* | (2006.01) | |
| *G06F 9/46* | (2006.01) | |
| *G06F 12/06* | (2006.01) | |

(52) U.S. Cl.
CPC ...... *G06F 12/1483* (2013.01); *G06F 9/30189* (2013.01); *G06F 9/544* (2013.01); *G06F 12/0238* (2013.01); *G06F 12/084* (2013.01); *G06F 13/1668* (2013.01); *G06F 2212/7201* (2013.01)

(58) Field of Classification Search
CPC .. G06F 12/1483; G06F 9/30189; G06F 9/544; G06F 12/0238; G06F 12/084; G06F 13/1668; G06F 2212/7201
USPC .......................................................... 711/163
See application file for complete search history.

(56) References Cited

U.S. PATENT DOCUMENTS

| | | | | |
|---|---|---|---|---|
| 2005/0273782 | A1* | 12/2005 | Shpeisman | G06F 9/52 718/100 |
| 2008/0040562 | A1* | 2/2008 | Gower | G06F 1/3225 713/320 |
| 2008/0189560 | A1* | 8/2008 | Case | G06F 12/1458 713/193 |

(Continued)

FOREIGN PATENT DOCUMENTS

KR     100740635 B1     7/2007

*Primary Examiner* — Tracy A Warren
*Assistant Examiner* — Sidney Li

(57) ABSTRACT

A data processing system may be configured to include a memory device, a controller configured to access the memory device when a host requests offload processing of an application, and process the application, and a sharing memory management component within the controller and configured to: set controller owning rights of access to a target region of the memory device in response to the host stores, in the target region, data used for the requested offload processing of the application; and set the controller owning rights of access or the host owning rights of access to the target region based on a processing state of the application.

12 Claims, 14 Drawing Sheets

(56) References Cited

U.S. PATENT DOCUMENTS

| | | | |
|---|---|---|---|
| 2009/0150621 A1* | 6/2009 | Lee | G11C 8/16 |
| | | | 711/149 |
| 2017/0199704 A1* | 7/2017 | Guney | G06F 9/524 |
| 2019/0042093 A1* | 2/2019 | Adams | G06F 3/0655 |
| 2019/0079859 A1* | 3/2019 | Li | G06F 12/0246 |
| 2020/0201692 A1* | 6/2020 | Kachare | G06F 9/547 |

* cited by examiner

FIG.9

| Bank 7 | Bank 8 |
|--------|--------|
| Bank 5 | Bank 6 |
| Bank 3 | Bank 4 |
| Bank 1 | Bank 2 |

(a)

| Bank 7 | Bank 8 |
|--------|--------|
| Bank 5 | Bank 6 |
| Bank 3 | Bank 4 |
| Bank 1 | Bank 2 |

(b)

| Bank 7 | Bank 8 |
|--------|--------|
| Bank 5 | Bank 6 |
| Bank 3 | Bank 4 |
| Bank 1 | Bank 2 |

(c)

| Bank 7 | Bank 8 |
|--------|--------|
| Bank 5 | Bank 6 |
| Bank 3 | Bank 4 |
| Bank 1 | Bank 2 |

| Bank 7 | Bank 8 |
|--------|--------|
| Bank 5 | Bank 6 |
| Bank 3 | Bank 4 |
| Bank 1 | Bank 2 |

(a)

| Bank 1 | Bank 2 |
|--------|--------|
| Bank 5 | Bank 6 |
| Bank 3 | Bank 4 |
| Bank 1 | Bank 2 |

(b)

| Bank 1 | Bank 2 |
|--------|--------|
| Bank 3 | Bank 4 |
| Bank 3 | Bank 4 |
| Bank 1 | Bank 2 |

(c)

| Bank 1 | Bank 2 |
|--------|--------|
| Bank 3 | Bank 4 |
| Bank 3 | Bank 4 |
| Bank 1 | Bank 2 |

(d)

DATA PROCESSING SYSTEM AND OPERATING METHOD THEREOF

CROSS-REFERENCES TO RELATED APPLICATION

The present application is a continuation of U.S. patent application Ser. No. 16/996,638, filed on Aug. 18, 2020, which claims priority under 35 U.S.C. § 119(a) to Korean application number 10-2020-0029131, filed on Mar. 9, 2020, in the Korean Intellectual Property Office, which are incorporated herein by reference in their entirety.

BACKGROUND

1. Technical Field

Various embodiments generally relate to a computing device, and more particularly, to a data processing system and an operating method thereof.

2. Related Art

As interest in artificial intelligence applications and big data analysis increases, computing systems should be capable of efficiently processing large and ever-increasing amounts of data.

Earlier computing systems utilized processor-driven computing. However, recent computing systems now often utilize data-driven computing or memory-driven computing, where large amounts of data are processed in parallel at high speeds. Accordingly, the computation performance of these computing systems is maximized because a data bottleneck phenomenon that occurs between a processor and a memory is reduced.

In a memory-driven computing device, a processor for performing operations may be positioned within a memory device or near the memory device. For big data processing applications, a massive amount of data is transmitted and received between the processor and the memory device. This large amount of transmitted and received data relates to the consumption power and computation performance of an associated data processing system performing the data processing applications.

SUMMARY

In an embodiment, a data processing system may be configured to include a memory device; a controller configured to: access the memory device when a host requests offload processing of an application; and process the application; and a sharing memory management component within the controller and configured to: set controller owning rights of access to a target region of the memory device in response to the host stores, in the target region, data used for the requested offload processing of the application; and set the controller owning rights of access or the host owning rights of access to the target region based on a processing state of the application.

In an embodiment, an operating method of a data processing system including a memory device and a controller configured to configured to control the memory device, the method comprising: receiving a request from a host to perform offload processing of an application by the controller; storing, in a target region of the memory device, data used for the offload processing of the application; setting, by the controller, controller owning rights of access to the target region; and setting, by the controller, the controller owning rights of access or host owning rights of access to the target region based on a processing state of the application.

In an embodiment, a data processing system may be configured to include a memory device; a controller that: accesses the memory device when a host requests offload processing of an application, wherein first data comprising a program code of the application is stored in a first region of the memory device and second data computed by the program code is stored in a second region of the memory device; processes the application; and sets controller owning rights of access or host owning rights of access to a target region of the memory device based on a processing state of the application.

BRIEF DESCRIPTION OF THE DRAWINGS

FIGS. 9 and 10 are concept views for describing an operating method of the data processing system according to embodiments.

DETAILED DESCRIPTION

Hereinafter, embodiments are described in more detail with reference to the accompanying drawings.

Figure 1:
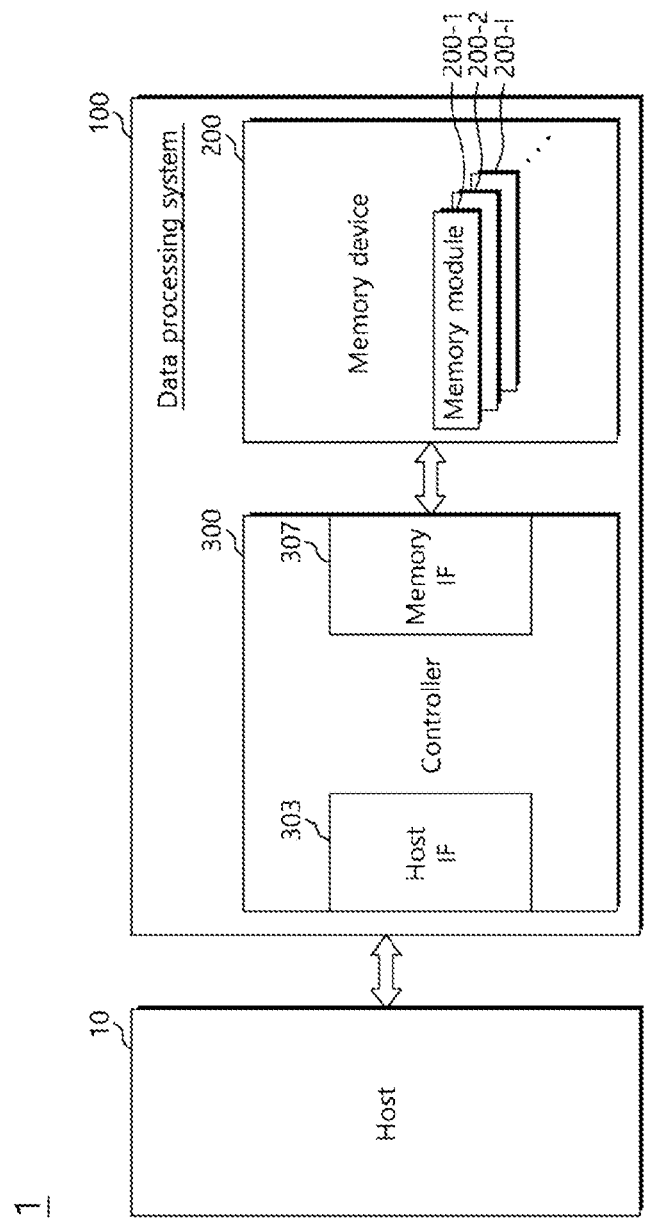
FIG. 1 illustrates a configuration of an electronic device including a data processing system according to an embodiment.

FIG. 1 illustrates a configuration of an electronic device 1 including a data processing system 100 according to an embodiment.

Referring to FIG. 1, the electronic device 1 may include a host 10 and the data processing system 100.

The electronic device 1 may be various electronic devices, such as a personal computer, a server computer, a mobile computing device, and/or an electronic control unit for a vehicle.

The electronic device 1 may include a high performance computing (HPC) device for performing an operation in a cooperative way using a super computer and/or a computer cluster, or an array of networked information processing devices or servers for processing data individually.

The host 10 may provide various services to a user through a user interface (not illustrated). To this end, the host 10 may transmit a request, address, and/or associated data to the data processing system 100, and may receive the results of the processing from the data processing system 100.

The data processing system 100 may process (or operate) a corresponding operation in response to the request and the address received from the host 10, and may transmit to the host 10 data obtained via the results of the processing.

The host 10 may request data input and/or output from the data processing system 100, or may request that the data processing system 100 offload an application accompanied by data input and output and to process (or execute) the application. When requesting the offload processing of the application, the host 10 may transmit, to the data processing system 100, operation control information and an initial parameter (or the address of a memory region in which the initial parameter has been stored). The operation control information may include the type of application to be executed by the data processing system 100, a program code of the application, or the storage address of the program code. The initial parameter may include initial data used to execute the program code or the address stored the initial data.

The data processing system 100 may process the request of the host in response to the operation control information and the initial parameter. In this case, an offload processing of the application means that an operation of the host 10 is entrusted to another device, such as the data processing system 100.

In one embodiment, the host 10 may request that the data processing system 100 offload a neural network application, such as an operation for neural network processing in another aspect, and to process the operation, but embodiments are not limited to these applications. When the host 10 requests operation processing for a neural network application from the data processing system 100, an initial parameter may include or indicate initial data and an initial weight.

The data processing system 100 may include a memory device 200 and a controller 300. In an embodiment, the controller 300 is a digital circuit that manages the flow of data going to and from the memory device 200. The controller may be formed on a chip independently or integrated with one or more other circuits.

The host 10 may transmit operation control information to the controller 300 in order to request the offload processing of a specific application from the data processing system 100, and/or may store an initial parameter in the memory device 200 by transmitting the initial parameter to the memory device 200.

The memory device 200 may store data, or output stored data, under the control of the controller 300. The memory device 200 may include a plurality of memory modules 200-1 to 200-I, and may be configured to be accessible in a page (or byte) unit. Thus, the controller 300 may access the memory device 200 in a page unit.

The memory modules 200-1 to 200-I may include volatile memory modules and/or may include a nonvolatile memory module. The memory module includes a plurality of memory cells coupled between a word line (or row line) and a bit line (or column line or string). For example, memory cells coupled to one word line may form one page.

The volatile memory module may be configured to include a dynamic random access memory (DRAM) and/or a static random access memory (SRAM). The nonvolatile memory module may be configured to include at least one of an electrically erasable and programmable ROM (EEPROM), a NAND flash memory, a NOR flash memory, a phase-change RAM (PRAM), a resistive RAM (ReRAM), a ferroelectric RAM (FRAM), and/or a spin torque transfer magnetic RAM (STT-MRAM).

In one embodiment, each of the memory modules 200-1 to 200-I may be a memory module or high bandwidth memory (HBM) of a single in-line memory module (SIMM) or dual inline memory module (DIMM) form including multiple memory chips mounted on a module board, such as a printed circuit board. The HBM module may include a plurality of HBMs and at least one hardware accelerator mounted on an interposer. In one embodiment, the memory modules 200-1 to 200-I may be configured such that the controller 300 is included on a module board or a form in which the controller 300 is included in a base die, in the case of an HBM module.

In response to operation control information provided by the host 10, the controller 300 may read a program code from a memory region corresponding to the address stored an application program code, may load the read program code onto an internal memory, may read an initial parameter from the memory device 200, may load the read initial parameter onto the internal memory, and/or may execute or compute the program code.

The application program code may be stored in the memory of the host 10 or a nonvolatile memory module of the memory device 200. Data generated as the program code of the application is executed and may be stored in the memory device 200 and provided to the host 10. For example, data generated as the program code is executed and may be temporarily stored in a volatile memory module, and then may be stored in a nonvolatile memory module.

In one embodiment, the host 10 may request that the data processing system 100 offload a machine learning or artificial intelligence application (e.g., a neural network operation) to process the machine learning or artificial intelligence application.

In one embodiment of the technology, the controller 300 may include a host interface (IF) 303 and a memory interface (IF) 307. The controller 300 may be positioned near the memory device 200, and may access the memory device 200 through the memory IF 307. The data processing system 100 illustrated in FIG. 1 may be denoted as a processor near memory (PNM) and/or may perform near-memory computing (NMC).

In one embodiment, when the host 10 stores a program code and initial parameter for a specific application in the memory device 200, and requests the data processing system 100 to offload and process the specific application, the controller 300 may set controller owning rights of access to a first region of the memory device 200 in which the program code has been stored and a second region of the memory device 200 in which the initial parameter has been stored. The controller 300 may store, in the second region of the memory device 200, data generated as the result of processing of the specific application, and may also set the host owning the rights of access to the second region.

When the host 10 stores target data to be processed in a specific region of the memory device 200, a process of setting, by the controller 300, rights of access to the data storage region, processing an application, and transferring the rights of access to the host 10 again may be repeated until the execution of an application whose processing has been requested by the host 10 is terminated.

In one embodiment, the controller 300 may set only the controller 300 owning rights of access to a memory region in which first data to be continuously used by the controller 300 (e.g., a program code while an application whose processing has been requested by the host 10 is processed has been stored) until the processing of the application is terminated.

In one embodiment, the controller 300 may set the controller 300 owning rights of access to a memory region in which second data (e.g., operation data) computed while an application whose processing has been requested by the host 10 is processed has been stored, may set rights of access while an operation is performed, and/or may set the host 10 owning the rights of access to the memory region after the operation is terminated.

As described herein, the controller 300 can exclusively access a region in which data necessary for an operation has been stored, can process an application, and data generated as the results of the processing can be accessed by the host 10. Accordingly, operation speed of the electronic device 1 can be increased because the amount of data transmitted and received between the host 10 and the memory device 200 is minimized.

In one embodiment, the controller 300 may transmit, to the memory device 200, a mode setting command including access right information for each address of a memory region. In response to the command, the memory device 200 may set a mode register set (MRS). In one embodiment, the memory device 200 may have a region that is divided into banks. The controller 300 may transmit access right information for each bank to the memory device 200 in the form of an MRS command.

The access right information for each memory region may be set through an MRS, but the present disclosure is not limited thereto, and the access right information for each memory region may be set using various methods, such as a mail box.

When access right information for each region is set in the memory device 200, the memory device 200 may permit access to a specific memory region (or bank) only if a subject attempting to access the specific memory region is the same as a set value. If the subject attempting to access the specific memory region is different from the set value, the memory device 200 may generate error information and transmit the error information to the host 10 through the controller 300, so that the error information is used for debugging.

Figure 2:
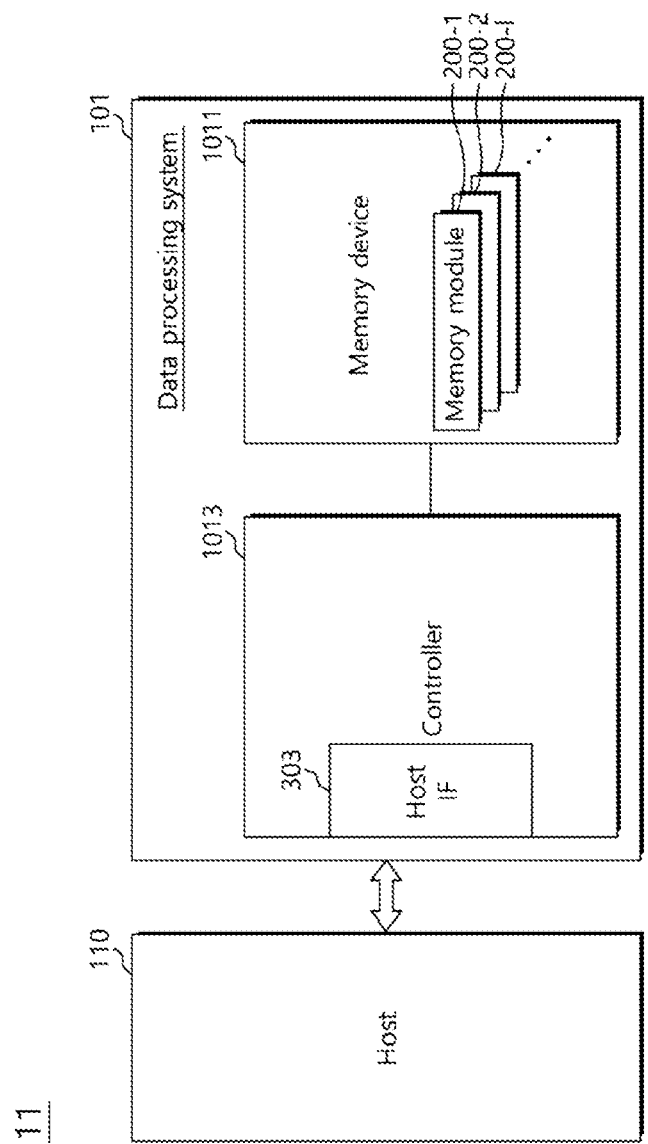
FIG. 2 illustrates a configuration of an electronic device including a data processing system according to an embodiment.

FIG. 2 illustrates a configuration of an electronic device 11 including a data processing system 101 according to an embodiment.

The electronic device 11 illustrated in FIG. 2 may include a host 110 and the data processing system 101.

The data processing system 101 may include a memory device 1011, including a plurality of memory modules 200-1 to 200-I, and a controller 1013.

Compared to the data processing system 100 illustrated in FIG. 1, the data processing system 101 of FIG. 2 may be configured as a united or single package, in which the controller 1013 is included within the memory device 1011, which may be denoted as a processor in memory (PIM). The united or single package means that integrated circuit devices, such as the controller 1013 and the memory device 1011, have been mounted on or as one package.

Figure 3:
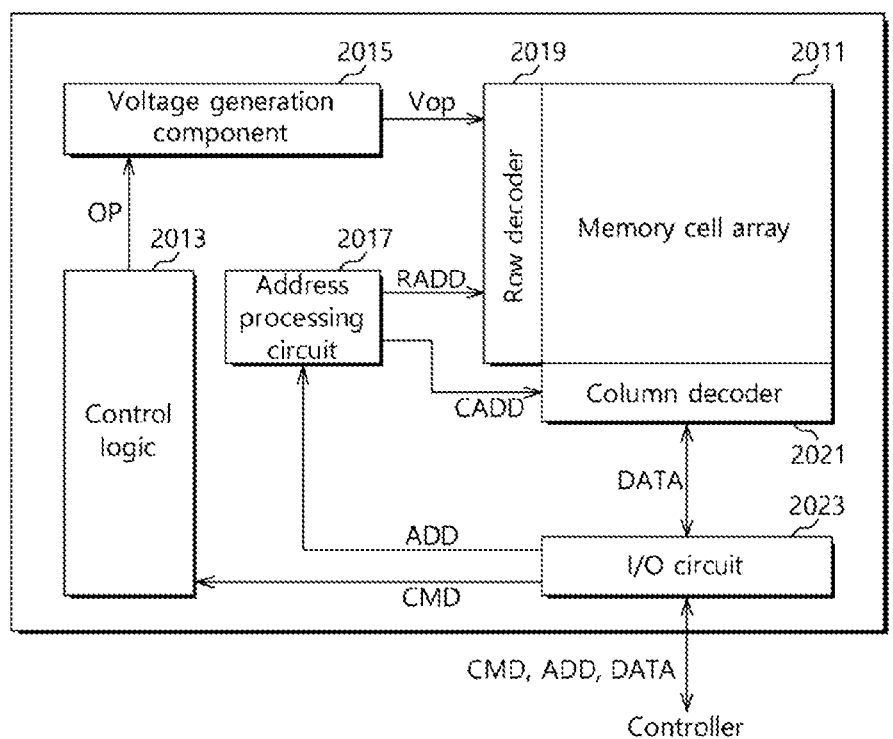
FIG. 3 illustrates a configuration of memory modules according to an embodiment.

FIG. 3 illustrates a configuration of the memory modules 200-1 to 200-I according to an embodiment.

Each of the memory modules 200-1 to 200-I may include a plurality of memory banks 201.

Referring to FIG. 3, the memory bank 201 may include a memory cell array 2011 in which data is stored and peripheral circuits 2013, 2015, 2017, 2019, 2021 and 2023 configured to control internal operations of the memory cell array 2011, such as the program, read, and/or refresh operations. The peripheral circuits 2013, 2015, 2017, 2019, 2021 and 2023 may include control logic 2013, a voltage generation unit 2015, an address processing circuit 2017, a row decoder 2019, a column decoder 2021 and an I/O circuit 2023.

The memory cell array 2011 may include a plurality of memory cells, for example, DRAM cells.

The control logic 2013 may output an operation code OP in response to a command CMD received from the I/O circuit 2023. The control logic 2013 may output the operation code OP for generating voltages necessary for program, read, and/or refresh operations.

The voltage generation unit 2015 may generate operation voltages Vop necessary for program, read and/or refresh operations in response to the operation code OP, and may output the generated operation voltages Vop.

The address processing circuit 2017 may divide an address ADD, received from the I/O circuit 2023, into a row address RADD and a column address CADD, and may output the row address RADD and the column address CADD.

The row decoder 2019 may transmit the operation voltages Vop to the memory cell array 2011 in response to the row address RADD.

The column decoder 2021 may transmit, to the memory cell array 2011, data DATA received from the I/O circuit 2023, or transmit, to the I/O circuit 2023, data DATA read from the memory cell array 2011, in response to the column address CADD.

The I/O circuit 2023 may receive the command CMD, the address ADD and the data DATA from the controller 300 or the controller 1013. The I/O circuit 2023 may transmit the command CMD received from the controller 300 or the controller 1013 to the control logic 2013, may transmit the address ADD received from the controller 300 or the controller 1013 to the address processing circuit 2017, may receive data DATA received from the controller 300 or the controller 1013 may transmit to the column decoder 2021, and may transmit the data DATA received from the column decoder 2021 to the controller 300 or the controller 1013.

Figure 4:
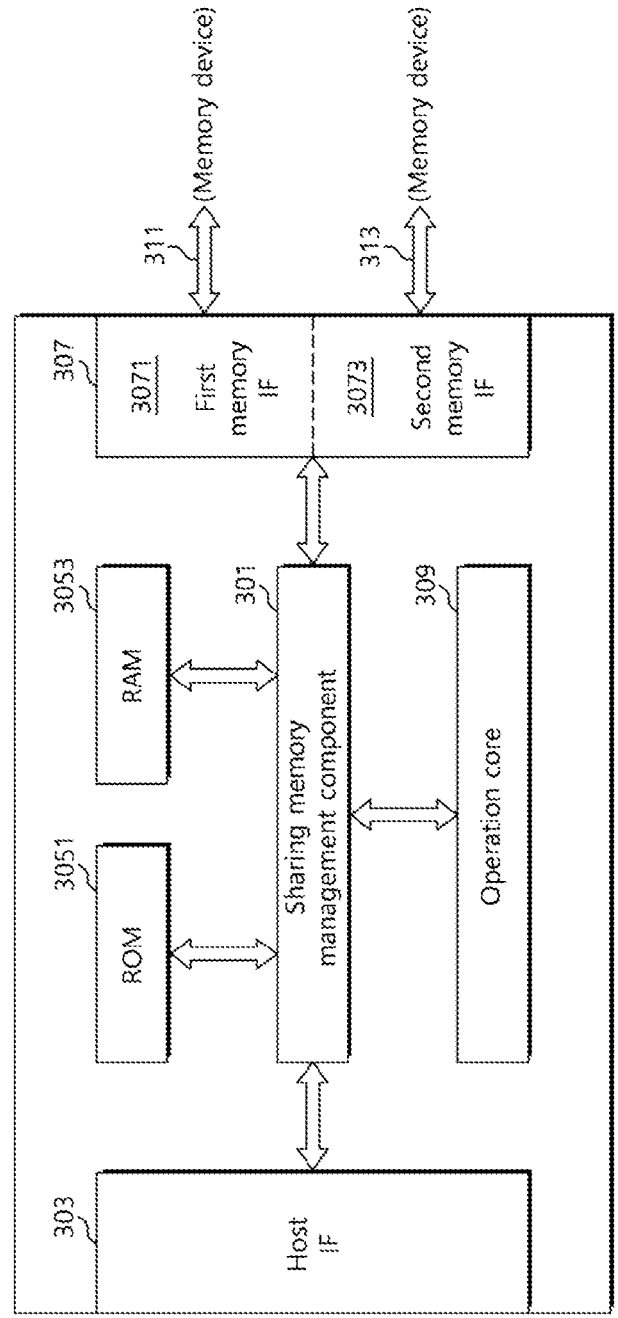
FIG. 4 illustrates a configuration of a controller according to an embodiment.

FIG. 4 illustrates a configuration of a controller according to an embodiment, and is an exemplary diagram of the controller 300 illustrated in FIG. 1.

Referring to FIG. 4, the controller 300 according to an embodiment may include a sharing memory management component 301, a host IF 303, a ROM 3051, a RAM 3053, a memory IF 307 and an operation core 309.

The sharing memory management component 301 may control an overall operation of the memory device 200, and may control the operation core 309 to process an operation requested by the host 10 in response to a command transmitted by the host 10.

The host IF 303 may provide an interface (IF) between the host 10 and the data processing system 100. The host IF 303 may provide the operation core 309 with a command and data provided by the host 10 through the sharing memory management component 301. The host IF 303 may facilitate data to be transmitted and received between the host 10 and the memory device 200 under the control of the sharing memory management component 301.

The ROM 3051 may store a program code used to control the operation of the controller 300, for example, firmware or software, and may store code data used by program codes.

The RAM 3053 may store data used to control the operation of the controller 300, or data generated by the controller 300.

The memory IF may include a first memory interface (IF) 3071 and a second memory interface 3073.

The first and second memory IFs 3071 and 3073 may be physical communication channels that connect the controller 300 and the memory device 200.

In one embodiment, the operation core 309 may perform an operation for a specialized application executed in the electronic device 1. In one embodiment, the electronic device 1 may execute a machine learning or artificial intelligence application that requires a high bandwidth. The operation core 309 may be a hardware accelerator, which executes a logical function specialized for the machine learning or artificial intelligence application.

The operation core 309 may use data provided by the host 10 or the memory device 200 in order to process an operation requested by the host 10.

The host 10 may instruct the data processing system 100 to offload operation processing for a specific application onto the operation core 309 of the controller 300 and to perform the operation processing using the operation core 309. The sharing memory management component 301 may extract the offload command of the host 10, may decode the offload command, and may control the operation core 309.

The operation core 309 may perform the operation based on a program code and initial parameter loaded onto the memory device 200 in response to the command output by the sharing memory management component 301. Data generated as the result of the processing of the operation core 309 may be stored in a specific region of the memory device 200 and transmitted to the host 10.

In one embodiment, the operation core 309 may include an arithmetic logic unit (ALU) and a floating point unit (FPU). The operation core (or accelerator) 309 may be selected from various types of accelerators, such as a field-programmable gate array (FPGA), a massively parallel processor array (MPPA), a graphics processing unit (GPU), an application-specific integrated circuit (ASIC), a neural processing unit (NPU), a tensor processing unit (TPU), and/or a multi-processor system-on-chip (MPSoC).

In one embodiment, when the host 10 stores a program code and initial parameter for a specific application in the memory device 200 and requests offload processing for the specific application, the sharing memory management component 301 may set the controller owning rights of access to a first region of the memory device 200 in which the program code has been stored and a second region of the memory device 200 in which the initial parameter has been stored. The sharing memory management component 301 may store, in the second region of the memory device 200, operation results using data stored in the second region, and may set the host owning the rights of access to the second region.

In an embodiment, the process of storing, by the host 10, target data to be processed in a specific region of the memory device 200 may include setting, by the controller 300, rights of access to the data storage region, processing an application, and transferring the rights of access to the host 10 again, may be repeated until the execution of an application whose processing has been requested by the host 10 is terminated.

Figure 5:
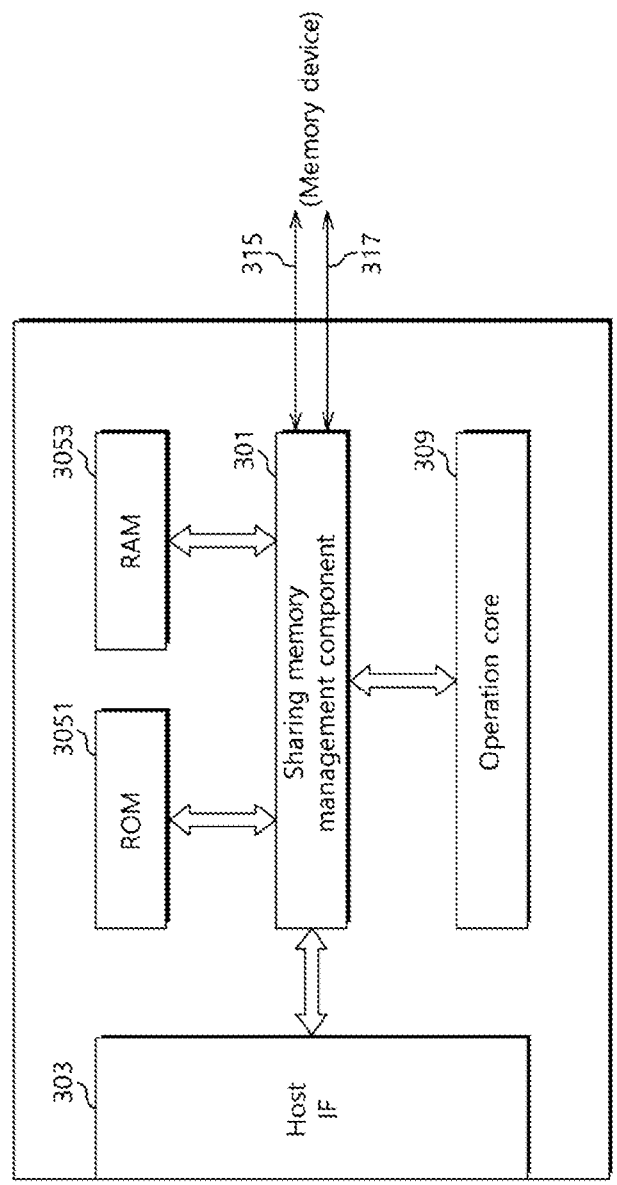
FIG. 5 illustrates a configuration of a controller according to an embodiment.

FIG. 5 illustrates a configuration of a controller according to an embodiment, and is an exemplary diagram of the controller 1013 illustrated in FIG. 2.

The controller 1013 illustrated in FIG. 5 may be configured to execute an application requested by the host 110 within the memory device 1011.

Referring to FIG. 5, the controller 1013 may be coupled to the memory device 1011 through a first bus 315 and a second bus 317. The first bus 315 may function as a path through which the host 110 may access the memory device 1011. The second bus 317 may function as a path through which the sharing memory management component 301 may access the memory device 1011.

Figure 6:
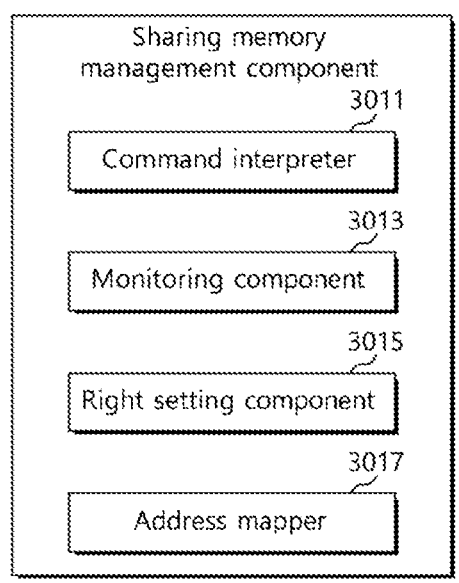
FIG. 6 illustrates a configuration of a sharing memory management component according to an embodiment.

FIG. 6 illustrates a configuration of the sharing memory management component 301 according to an embodiment.

Referring to FIG. 6, the sharing memory management component 301 may include a command interpreter 3011, a monitoring component 3013, a right setting component 3015, and an address mapper 3017.

The command interpreter 3011 may extract an offload command of the host 10 or 110, may decode the offload command, and/or may control the operation core 309.

The monitoring component 3013 may extract the address of a memory region in which data of the host 10 or 110 is stored. Furthermore, the monitoring component 3013 may monitor whether an operation using data stored in the memory device 200 or 1011 has been completed.

The right setting component 3015 may set rights of access to a memory region in which data related to an application whose offload processing has been requested by the host 10 or 110 has been stored.

In one embodiment, the right setting component 3015 may set only the controller 300 or 1013 owning rights of access to a memory region in which first data that needs to be continuously used by the controller 300 or 1013 (e.g., a program code) while an application whose processing has been requested by the host 10 or 110 is processed has been stored, only until the processing of the application is terminated.

The right setting component 3015 may set the controller 300 or 1013 owning rights of access to a memory region in which second data computed while an application whose processing has been requested by the host 10 or 110 is processed has been stored, while an operation is performed, and may set the host 10 or 110 owning the rights of access to the memory region, after the operation is terminated.

The host 10 or 110 and the controller 300 or 1013 may access the memory device 200 or 1011 using a physical address of the memory device 200 or 1011 without any change, or may access the memory device 200 or 1011 using a logical address assigned by the host 10 or 110 or the controller 300 or 1013.

When the controller 300 or 1013 accesses the memory device 200 or 1011 using a logical address, the address mapper 3017 may store mapping information between a physical address of a memory region to which access rights have been transferred to the controller 300 or 1013 and the logical address used by the controller 300 or 1013 to access the memory device 200 or 1011.

In one embodiment, the address mapper 3017 may assign a logical address to each of memory regions in which data transmitted by the host 10 or 110 has been stored in ascending order from an initial value (e.g., No. 0 address) based on an order in which the data has been stored, and may map the logical address onto a physical address.. However, the address mapper 3017 may assign logical addresses in other manners or processes.

The sharing memory management component 301, according to an embodiment, may set the controller 300 or 1013 owning rights of access to a data storage region when the host 10 or 110 stores data necessary for application processing in a specific region of the memory device 200 or 1011, and may set the controller 300 or 1013 or the host 10 or 110 owning rights of access to a data storage region based on a processing state of an application.

Figure 7:
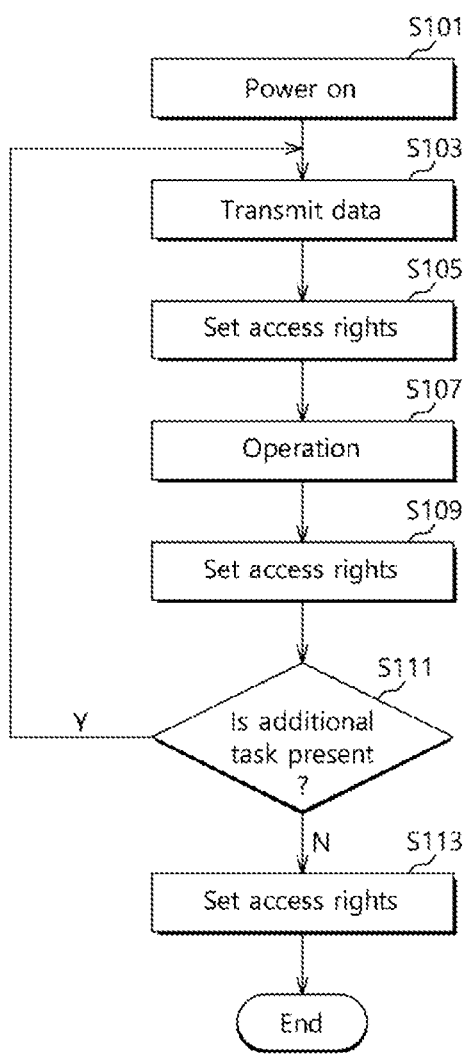
FIGS. 7 and 8 are flowcharts for describing an operating method of the data processing system according to embodiments.
Figure 8:
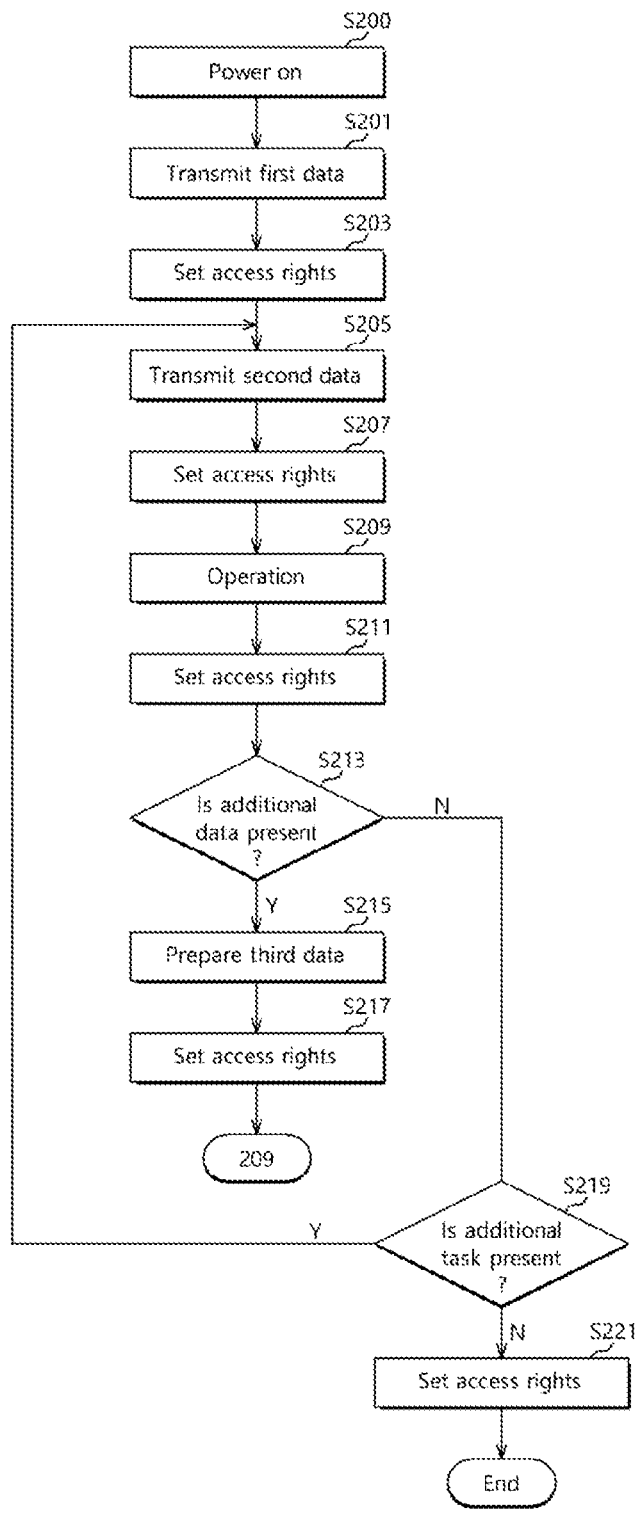

FIGS. 7 and 8 are flowcharts for describing an operating method of the data processing system according to embodiments.

Referring to FIG. 7, when the electronic device 1 or 11 is powered on and booted (S101), rights of access to all the regions of the memory device 200 or 1011 may be assigned to the host 10 or 110.

When the host 10 or 110 requests the offload processing of a specific application to the data processing system 100 or 101 and transmits data for the offload processing (S103), the controller 300 or 1013 may set the controller 300 or 1013 owning rights of access to a memory region in which the data has been stored by the host 10 or 110 (S105). In one embodiment, the data transmitted by the host 10 or 110 may include first data, such as a program code stored in a first region of the memory device 200 or 1011, and second data, such as operation data stored in a second region of the memory device 200 or 1011 and computed by the program code. When setting the access rights (S105), the controller 300 or 1013 may transfer the rights of access to the first region and the second region to the controller 300 or 1013.

The controller 300 or 1013 may compute the data stored in the second region using the program code stored in the first region (S107), may set the host 10 or 110 owning the rights of access to the second region when the operation is completed, and may report, to the host 10 or 110, that the operation has been completed (S109).

The host 10 or 110 may check whether there is an additional task for which offload processing is to be requested (S111). If, as a result of the check, the additional task is present (S111: Yes or Y), the host 10 or 110 may transmit data for processing the additional task (S103), and subsequent or additional processes may be performed.

If, as a result of the check, the additional task is not present (S111: No or N), the controller 300 or 1013 may set the host 10 or 110 owning the rights of access to all the regions of the memory device 200 or 1011 (S113).

Referring to FIG. 8, when the electronic device 1 or 11 is powered on and booted (S200), rights of access to all the regions of the memory device 200 or 1011 may be assigned to the host 10 or 110.

When the host 10 or 110 requests the offload processing of a specific application from the data processing system 100 or 101 and transmits first data for the offloading processing (S201), the controller 300 or 1013 may set the controller 300 or 1013 owning rights of access to a memory region in which the first data has been stored by the host 10 or 110 (S203). In one embodiment, the first data may include data that is continuously used when an application whose offload processing has been requested is processed, such as a program code stored in a first region of the memory device 200 or 1011.

When the host 10 or 110 transmits second data (S205), the controller 300 or 1013 may set the controller 300 or 1013 owning rights of access to a memory region in which the second data has been stored by the host 10 or 110 (S207). In one embodiment, the second data may include data stored in a second region of the memory device 200 or 1011 and computed by a program code. The data stored in the second region may be updated with interim and/or final operation results as an operation proceeds.

The controller 300 or 1013 may compute the data stored in the second region using the program code stored in the first region (S209). When the operation is completed, the controller 300 or 1013 may report the completion of the operation to the host 10 or 110, and may set the host 10 or 110 owning the rights of access to the second region (S211).

The host 10 or 110 may check whether there is additional data to be transmitted to the memory device 200 or 1011, such as data used for an operation exceeds the size of the second region (S213). If, as a result of the check the additional data is present (S213: Yes or Y), the host 10 or 110 may store third data in a third region of the memory device 200 or 1011 (S215). When the operation for the second data stored in the second region is completed, the controller 300 or 1013 may set the controller 300 or 1013 owning rights of access to the third region (S217), and may proceed to step S209 and perform an operation on the third data.

If, as a result of the check, the additional data is not present (S213: No or N), the host 10 or 110 may check whether there is an additional task to be processed based on the program data, e.g., the first data (S219).

If, as a result of the check, the additional task is present (S219: Yes or Y), the host 10 or 110 may proceed to step S205, in which the host 10 or 110 transmits data for processing the additional task, and subsequent processes may be performed. If, as a result of the check, the additional task is not present (S219: No or N), the controller 300 or 1013 may set the host 10 or 110 owning the rights of access to all the regions of the memory device 200 or 1011 (S221).

FIGS. 9 and 10 are concept views for describing an operating method of the data processing system according to embodiments.

FIG. 9 illustrates a method of setting rights when the controller 300 or 1013 accesses the memory device 200 or 1011 using a physical address of the memory device 200 or 1011 without any change.

As illustrated in (a), when the electronic device 1 or 11 is powered on and booted, rights of access to all the regions of the memory device 200 or 1011 may be assigned to the host 10 or 110.

As illustrated in (b), the host 10 or 110 may request the offload processing of a specific application from the data processing system 100 or 101, and may store a program code for the offload processing in a first region (e.g., banks 7 and 8) of the memory device 200 or 1011. Accordingly, the controller 300 or 101 may set the controller 300 or 1013 owning rights of access to the banks 7 and 8.

As illustrated in (c), when the host 10 or 110 stores second data to be computed by the program code in a second region (e.g., banks 5 and 6), the controller 300 or 1013 may set the controller 300 or 1013 owning rights of access to the banks 5 and 6. Furthermore, the host 10 or 110 may prepare data for a next operation in a third region (e.g., banks 3 and 4).

As illustrated in (d), when an operation for the second data stored in the banks 5 and 6 is completed, the controller 300 or 1013 may set the host 10 or 110 owning the rights of access to the banks 5 and 6, may set the controller 300 or 1013 owning rights of access to the banks 3 and 4, and may perform an operation.

FIG. 10 illustrates a method of setting rights when the controller 300 or 1013 maps a logical address onto a physical address of the memory device 200 or 1011 and accesses the memory device 200 or 1011.

As illustrated in (a), when the electronic device 1 or 11 is powered on and booted, rights of access to all the regions of the memory device 200 or 1011 may be assigned to the host 10 or 110.

As illustrated in (b), the host 10 or 110 may request the offload processing of a specific application from the data processing system 100 or 101, and may store a program code for the offload processing in a first region (e.g., physical banks 7 and 8) of the memory device 200 or 1011. Accordingly, the controller 300 or 1013 may map logical addresses 1 and 2 onto the physical banks 7 and 8 and may set the controller 300 or 1013 owning rights of access to the logical banks 1 and 2.

As illustrated in (c), when the host 10 or 110 stores second data to be computed by the program code in a second region (e.g., physical banks 5 and 6), the controller 300 or 1013 may map logical addresses 3 and 4 onto the physical banks 5 and 6, and may set the controller 300 or 1013 owning rights of access to the logical banks 3 and 4. Furthermore, the host 10 or 110 may prepare data for a next operation in a third region (e.g., physical banks 3 and 4).

As illustrated in (d), when an operation for the second data stored in the logical banks 3 and 4 is completed, the controller 300 or 1013 may map the logical addresses 3 and 4 onto the physical banks 3 and 4, may set the controller 300 or 1013 owning the rights of access to the physical banks 3 and 4 corresponding to logical banks 3 and 4, and may perform an operation.

When the operations for all the data are completed, the controller 300 or 1013 may set the host 10 or 110 owning the rights of access to all the regions of the memory device 200 or 1011.

If the controller 300 or 1013 accesses the memory device 200 or 1011 using a logical address, the controller 300 or 1013 may control continuous access to the same logical region to be continuously accessed before an operation is to be performed. Thus, the frequency in which rights of access to each memory region are set can be significantly reduced.

According to the technology described herein, a processor within a memory device (e.g., in-memory) or at a place near a memory device (e.g., near-memory) may access the memory device independently of a host, and may perform an operation.

Further, the technology described herein reduces the consumption power of the data processing system and improves the computation performance of the system because the time necessary to access a memory device is reduced.

Also, performance degradation that occurs when any one device occupies a memory device can be prevented or mitigated because an independent memory interface (IF) and an independent memory space are used, so that a host outside the data processing system and an operation core within the data processing system can access the memory device at the same time.

Figure 11:
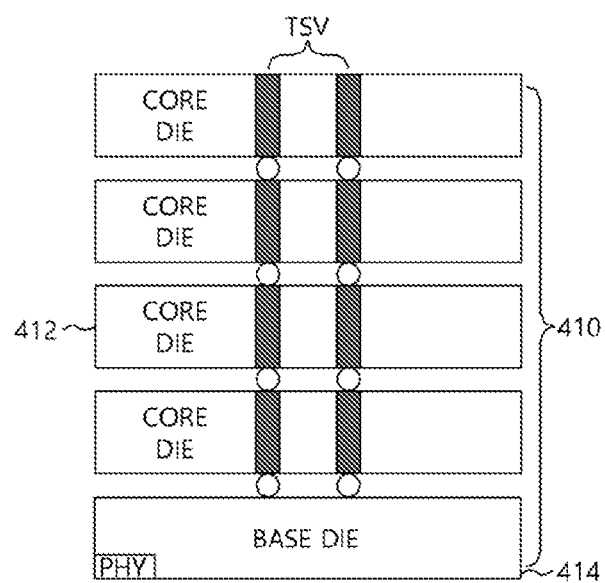
FIGS. 11, 12, and 13 illustrate stacked semiconductor apparatuses in accordance with embodiments.
Figure 12:
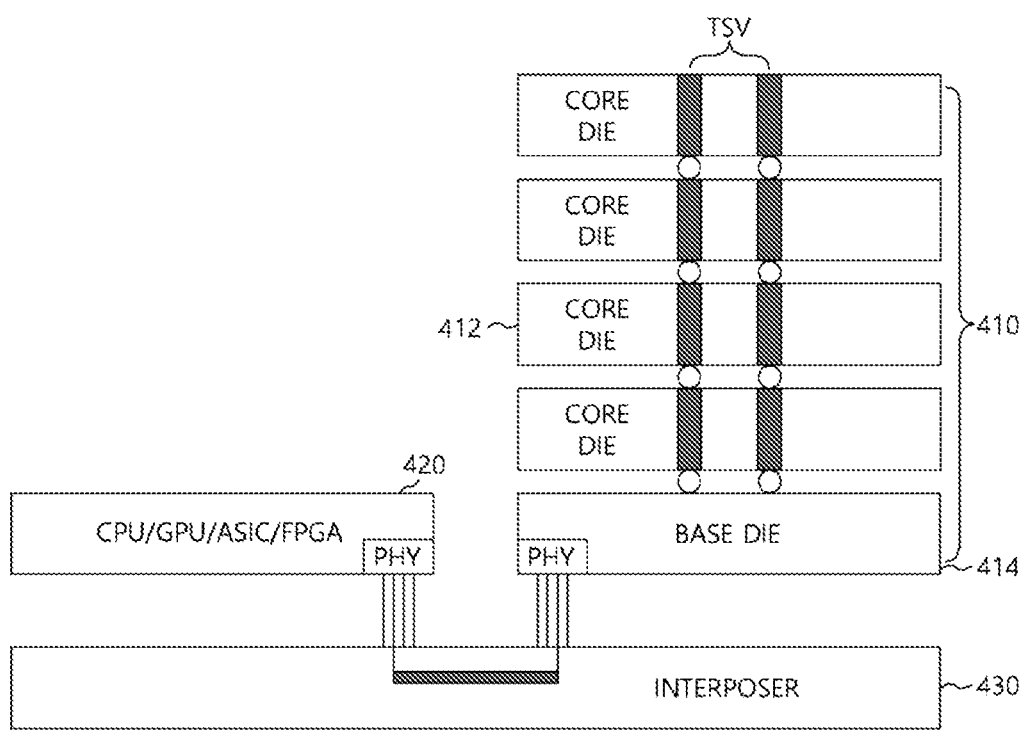
Figure 13:
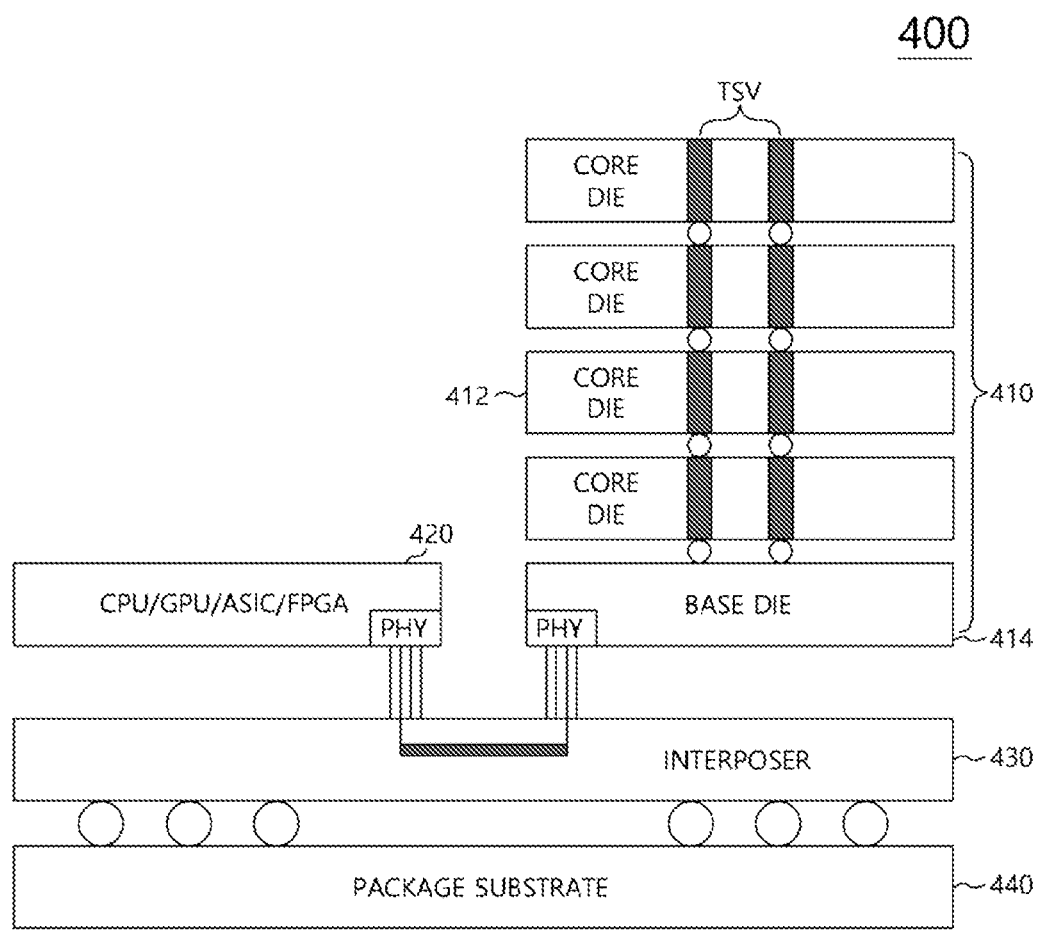

FIGS. 11 to 13 illustrate stacked semiconductor apparatuses in accordance with embodiments.

FIG. 11 illustrates a stacked semiconductor apparatus 40 in accordance with an embodiment.

The stacked semiconductor apparatus 40 may include a stack structure 410 in which a plurality of dies are stacked. The stack structure 410 may be configured as a high bandwidth memory (HBM) type in which the plurality of dies are stacked and electrically connected to one another via through-silicon vias (TSV), so that the number of input/output units is increased and thus a bandwidth is increased.

The stack structure 410 may include a base die 414 and a plurality of core dies 412.

The plurality of core dies 412 may be stacked on the base die 414 and electrically connected to one another via the through-silicon vias (TSV). In each of the core dies 412, memory cells for storing data and circuits for core operations of the memory cells may be disposed.

The core dies 412 may be electrically connected to the base die 414 via the through-silicon vias (TSV) and receive signals, power and the like from the base die 414 via the through-silicon vias (TSV).

The base die 414, for example, may include the controller 300 and the memory apparatus 200 illustrated in FIGS. 1 to 3. The base die 414 may perform various functions in the stacked semiconductor apparatus 40, for example, memory management functions such as power management and refresh functions of the memory cells, and/or timing adjustment functions between the core dies 412 and the base die 414.

A physical interface area PHY included in the base die 414 may be an input/output area of an address, a command, data, a control signal, and so on. The physical interface area PHY may be provided with a predetermined number of input/output circuits capable of satisfying a data processing speed required for the stacked semiconductor apparatus 40. A plurality of input/output terminals and a power supply terminal may be provided in the physical interface area PHY on the rear surface of the base die 414 to receive signals and power required for an input/output operation.

FIG. 12 illustrates a stacked semiconductor apparatus 400 in accordance with an embodiment.

The stacked semiconductor apparatus 400 may include a stack structure 410 of a plurality of core dies 412 and a base die 414, a memory host 420, and an interface substrate 430. The memory host 420 may be a CPU, a GPU, an application specific integrated circuit (ASIC), a field programmable gate arrays (FPGA), and so on.

The base die 414 may be provided with a circuit for an interface between the core dies 412 and the memory host 420. The stack structure 410 may have a structure similar to that described with reference to FIG. 11.

A physical interface area PHY of the stack structure 410 and a physical interface area PHY of the memory host 420 may be electrically connected to each other through the interface substrate 430. The interface substrate 430 may be referred to as an interposer.

FIG. 13 illustrates a stacked semiconductor apparatus 4000 in accordance with an embodiment.

It may be understood that the stacked semiconductor apparatus 4000 illustrated in FIG. 13 is obtained by disposing the stacked semiconductor apparatus 400 illustrated in FIG. 12 on a package substrate 440.

The package substrate 440 and the interface substrate 430 may be electrically connected to each other through connection terminals.

A system in package (SiP) type semiconductor apparatus may be implemented by stacking the stack structure 410 and the memory host 420, which are illustrated in FIG. 12, onto the interface substrate 430, and mounting the structures on the package substrate 440 for the purpose of forming the package.

Figure 14:
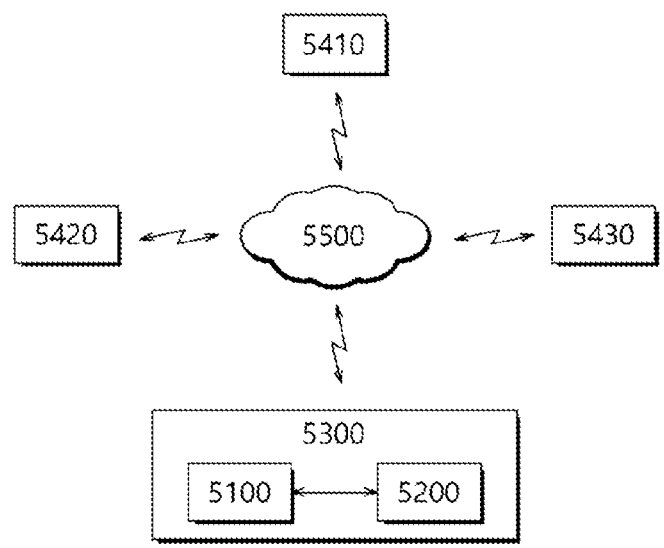
FIG. 14 illustrates a network system including a data is storage device in accordance with an embodiment.

FIG. 14 is a diagram illustrating a network system 5000 including a data storage device, in accordance with an embodiment. Referring to FIG. 14, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may include one or more of the data processing system 100 shown in FIG. 1, the stacked semiconductor apparatuses 40 shown in FIG. 11, the stacked semiconductor apparatus 400 shown in FIG. 12, or the stacked semiconductor apparatus 4000 shown in FIG. 13, or combinations thereof.

While various embodiments have been described above, it will be understood to those skilled in the art that the embodiments described are examples only. Accordingly, the data processing system and the operating method thereof described herein should not be limited based on the described embodiments.

Those skilled in the art to which this disclosure pertains should understand that the embodiments are only illustrative from all aspects not being limitative because this disclosure may be implemented in various other forms without departing from the technical spirit or essential characteristics of this disclosure. Accordingly, the scope of this disclosure is defined by the appended claims rather than by the detailed description, and all modifications or variations derived from the meanings and scope of the claims and equivalents thereof should be understood as being included in the scope of this disclosure.

What is claimed is:

1. A data processing system comprising:
a controller;
a volatile memory device including a plurality of memory regions, and configured to be granted owning rights of access to each of the plurality of memory regions by a host device or by the controller based on a processing state of an application, receive data used for a requested offload processing of the application, and store the data in a target region among the plurality of memory regions;
the controller configured to take over ownership of access to the target region and exclusively access the target region to process the application;
a nonvolatile memory device configured to store the result of processing of the application,
wherein the data used for the requested offload processing of the application comprises a first data including a program code of the application that is stored in a first physical region to which a first logical address has been assigned and a second data computed by the program code and stored in a second physical region to which a second logical address has been assigned; and
the controller is configured to assign the second logical address to a third physical region in which third data computed by the program code subsequent to the computation of the second data has been stored when an operation for the second data is completed.

2. The data processing system of claim 1,
wherein the nonvolatile memory device is configured to comprise a first region to store the first data comprising a program code of the application; and
wherein the volatile memory device is configured to comprise second region to store the second data computed by the program code.

3. The data processing system of claim 2, wherein the controller is further configured to:
set controller owning rights of access or host owning rights of access to the first region and the second region based on a processing state of the application,
set the controller owning rights of access to the first region until execution of the application is terminated, and
set the controller owning rights of access to the second region until operation results using the second data are stored in the second region.

4. The data processing system of claim 1, further comprising:
a first interface through which the host accesses the volatile memory device via the controller; and
a second interface through which the controller accesses the volatile memory device.

5. The data processing system of claim 1, wherein the controller and the volatile memory device are configured as independent module boards and configured to interface each other.

6. The data processing system of claim 1, wherein the controller is configured as a single package that includes the nonvolatile memory device.

7. The data processing system of claim 1, wherein the controller is configured to refresh memory cells included in the volatile memory device.

8. A method of operating a data processing system having a volatile memory device, a nonvolatile memory device, and a controller configured to control at least one of the volatile memory device and the nonvolatile memory device, the method comprising:
receiving a request from a host to perform offload processing of an application by the controller;
storing, by controlling of the controller, in a target region among a plurality of memory regions of the volatile memory device, data used for the offload processing of the application;
being granted, by the volatile memory device, owning rights of access to each of the plurality of memory regions by the host device or the controller based on a processing state of the application; and
taking over, by the controller, ownership of access to t he target region and exclusively accessing the target region to process the application,
wherein the data for the offload processing of the application includes first data having a program code of the application that is stored in a first physical region to which a first logical address has been assigned and second data computed by the program code that is stored in a second physical region to which a second logical address has been assigned; and
assigning, by the controller, the second logical address to a third physical region in which third data has been stored when an operation for the second data is completed.

9. The method of claim 8, further comprising:
storing, by the controller, the first data having a program code of the application in a first region of the nonvolatile memory device, and
setting controller owning rights of access to the first region until execution of the application is terminated.

10. The method of claim 9, further comprising:
storing, by the host, the second data to be computed by the program code in a second region of the volatile memory device, and
setting the controller owning rights of access to the second region until operation results using the second data are stored in the second region.

11. The method of claim 8, further comprising:
transmitting, by the controller to the memory device, a mode setting command including access right information for each region of the memory device, and
setting, by the memory device, a mode register set (MRS) based on the access right information.

12. The method of claim 8, wherein the controller controls the host to access the memory device through a first interface, and
wherein the controller accesses the memory device through a second interface.

* * * * *